Feb. 12, 1963
B. A. V. ANDERSSON ETAL
AIR-OIL SHOCK ABSORBER ESPECIALLY ADAPTED FOR GROUND VEHICLES
Filed March 29, 1960
3,077,345
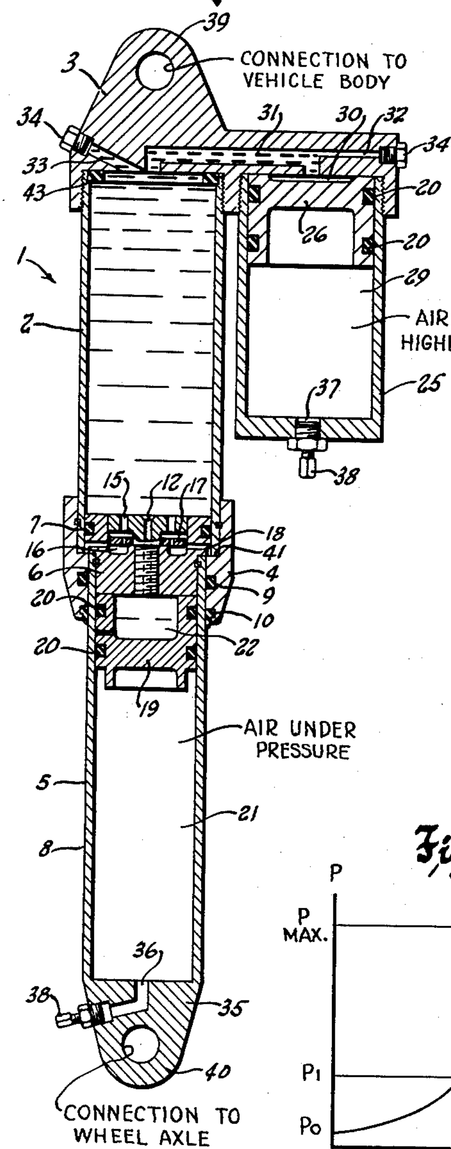
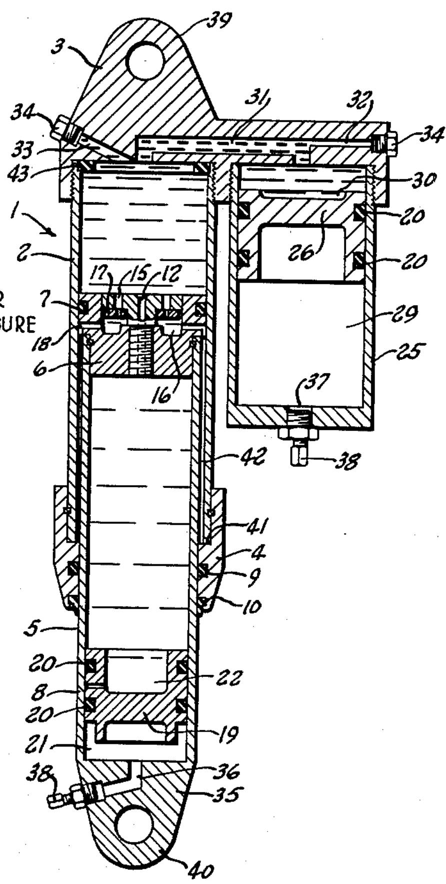
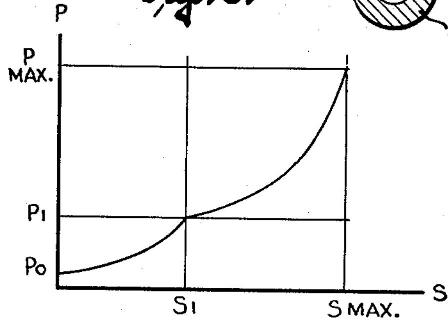
Inventors
Birger Anders Vilhelm Andersson
Bengt Ragnar Berglöf
By Ira Milton Jones
Attorney United States Patent Office 3,077,345
Patented Feb. 12, 1963

3,077,345
AIR-OIL SHOCK ABSORBER ESPECIALLY ADAPTED FOR GROUND VEHICLES

Birger Anders Vilhelm Andersson and Bengt Ragnar Berglof, both of Linkoping, Sweden, assignors to Svenska Aeroplan Aktiebolaget, a corporation of Sweden Filed Mar. 29, 1960, Ser. No. 18,287
10 Claims. (Cl. 267—64)

This invention relates to a shock absorbing device adapted to be connected between a pair of relatively movable elements for cushioning the force of abrupt, irregular movements of one of said elements toward and from the other; and more specifically the invention relates to air-oil shock absorbers for vehicles, by which the shock forces of abrupt up and down movements of a vehicle wheel, due to its travel over an uneven surface, are more or less completely absorbed and their transmission to the vehicle body is substantially prevented.

In the well known air-oil shock absorbers for aircraft landing gears, a wheel or other ground engaging element is connected with a piston which telescopes into a cylinder connected with the fuselage or other main structure of the aircraft. When the piston moves upwardly into the cylinder, due to upward force upon the wheel, as when it travels over a bump, the piston compresses air under pressure in the cylinder, by which the force of the upward piston travel is resiliently absorbed and cushioned. The air-oil shock absorber mechanism also includes an oil chamber in the cylinder and means on the piston cooperable with oil in the chamber to damp axial movement of the piston by the effect of fluid friction. Thus an air-oil shock absorber performs the dual function of resiliently cushioning abrupt upward movements of the wheel and of damping its relative downward movements to render them less abrupt and to retard what would otherwise be excessively rapid return movements of the piston following each upward displacement thereof.

While fairly satisfactory for aircraft, in which absorption of landing shocks is a primary consideration, shock absorbers of the air-oil type have heretofore been considered generally unsuitable for application to surface vehicles, and especially those which could be loaded to widely varying gross weights. This was because when the vehicle was empty or lightly loaded the air in the shock absorber was compressed to a relatively small extent, leaving a substantial amount of the piston stroke available for shock absorbing action, whereas when the vehicle was fully loaded the piston was displaced almost to the top of its stroke, due to further compression of the air, leaving only very small piston travel for shock absorbing action. Stated another way, when the vehicle was lightly loaded, the shock absorber provided good "springing" action, but with a heavy load on the vehicle the shock absorber was stiff and relatively unyielding; or the shock absorber could be designed to function satisfactorily at high gross weights, but in that case it would have excessive "springing" travel when the vehicle was lightly loaded.

One expedient that has been proposed for insuring satisfactory air-oil shock absorber travel under all normal conditions of loading of a ground vehicle has been the provision of means controllable from the driver's compartment to provide different values of air pressure preload in the shock absorbers to meet different conditions of gross vehicle weight. It was usually proposed to combine such an adjustably controllable shock absorber with a more or less conventional steel spring. Adjustable shock absorbers, however, complicated both the construction and the operation of the vehicle, especially in the case of trailers. For these reasons most vehicles have been equipped with conventional steel springs, which have well known disadvantages that include poor flexing action at the lower loading values, heavy weight, and poor damping characteristics which require that the spring be supplemented in many cases by hydraulic damping devices ("snubber" type shock absorbers) which further complicated construction.

With the foregoing in mind, it is a general object of this invention to provide an air-oil type of shock absorber, of the type comprising a cylinder adapted to be fixed to a vehicle body and a main piston telescopingly slidable within the cylinder and adapted to be connected with a wheel or the like, wherein an elastically compressible fluid medium such as air under pressure is employed to resiliently bias the main piston outwardly in the cylinder, and a liquid such as hydraulic fluid is employed to effect damping of the piston motion, and wherein the main piston has a dual range of "springing" actions, the first of which provides yielding resistance to a predetermined initial degree of piston travel into its cylinder and accommodates the weight of the vehicle itself, together with whatever load the vehicle may be carrying, and the second range of "springing" action providing greater yielding resistance to travel of the piston into its cylinder so as to provide for effective shock absorbing action substantially only after the limit of the first range of "springing" action has been reached.

Another object of this invention resides in the provision of an air-oil shock absorber for a wheeled vehicle or the like which provides both resilient "springing" action and hydraulic damping action without requiring the presence of any type of steel springs on the vehicle, which shock absorber automatically adjusts itself to widely varying gross weights of the vehicle and provides very satisfactory "springing" action both when the vehicle is unloaded or very lightly loaded and when it is loaded to its full gross weight.

It is also an object of this invention to provide an air-oil shock absorber of the character described having a dual range of "springing" actions, one of which accommodates the weight of the vehicle itself, plus its load, and the other of which thereafter provides for efficient "springing" action, which shock absorber may be preloaded with air under pressure to accommodate various anticipated ranges of vehicle gross weights and "springing" action requirements, but normally requires no adjustment or attention to enable it to accommodate different conditions.

A further object of this invention resides in the provision of an air-oil shock absorber of the character described which is rugged, inexpensive, compact and dependable, and which is readily adaptable to a wide range of vehicle types and installations.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a longitudinal sectional view of an air-oil shock absorber embodying the principles of this invention, shown in completely unloaded condition;

FIGURE 2 is a view similar to FIGURE 1 but showing the shock absorber with the main piston in the course of return stroke following cushioning of an abrupt shock; and FIGURE 3 is a graph of the "springing" characteristics of the device.

Referring now to the accompanying drawings, the numeral 1 designates generally a first shock receiving element comprising a main cylinder 2 having an end cap 3 at its upper end which includes an apertured lug 39 by which it is adapted to be pendantly secured to the body of a vehicle (not shown). The main cylinder 2 opens downwardly to receive a main piston 5 comprising a head 6 which is snugly slidable axially in the main cylinder and a smaller diameter tubular downwardly extending piston rod 8. The rod has its lower end closed by an end piece 35 that includes a lug 40 or the like by which a wheel (not shown) or other ground engaging element may be secured to the piston rod so that the latter will be driven up and down in its cylinder by the wheel. Thus the piston and its rod 8 may be considered a second shock receiving element that is cooperable with the element 1 and the cylinder thereon. The head 6 of the main piston is provided with an O-ring seal 7 that engages the wall of the main cylinder. At its lower end the main cylinder has an annular end piece 4 that defines a smaller diameter mouth for the cylinder and which is provided with an O-ring seal 9, that snugly embraces the piston rod 8, and with a wiper ring 10 that removes dirt and foreign matter from the piston rod as the piston is driven into the main cylinder. It is a feature of the invention that the tubular piston rod 8 affords an auxiliary cylinder, in which a piston-like movable wall member 19 is axially slidable to cooperate therewith in the provision of a variable volume auxiliary chamber 21 beneath the wall member 19.

The first shock receiving element 1, which may be considered as a fixed member, also carries a second auxiliary cylinder 25. The cylinder 25 is relatively short and of cup-like shape, and is carried by a lateral extension of the cap 3, so as to be located alongside the upper end portion of the main cylinder 2. The upper end of the cylinder 25 is communicated with the upper end of the main cylinder by means of a passage 31 in the cap 3. A piston-like movable wall member 26 is axially slidable in the short cylinder 25 and cooperates therewith to define a second variable volume auxiliary chamber 29, beneath the wall member 26. O-rings 20 around each of the movable wall members 19 and 26 cooperate with the chamber or cylinder walls surrounding them to provide good sliding seals.

Each of the auxiliary chambers or cylinders 21 and 29 is adapted to be filled with air under pressure, or with a similar elastically compressible medium. The first auxiliary chamber 21 may be filled through an air inlet passage 36 in its end closure 35, and the second auxiliary chamber 29 may be filled through a passage 37 in the bottom wall of the short cylinder 25. Both of the air inlet passages 36 and 37 are provided with accessible filler valves 38.

The auxiliary chamber 21 is at maximum volume when its movable wall member or piston 19 engages the underside of the piston head 6, while the second auxiliary chamber 29 is at maximum volume when its movable wall member or piston 26 engages the underside of the end cap 3. The auxiliary chambers are filled with air (or the like) under pressure when they are in their maximum volume conditions, and it is important to observe that the second auxiliary chamber 29 must be filled to a substantially higher pressure than the first auxiliary chamber 21.

Each of the movable wall members 19 and 26 has a concavity in its top, and these concavities define small chambers 22 and 30, respectively, but it should be observed that the chamber 22 is at all times communicated with the interior of the main cylinder 2 through a coaxial bore 12 in the piston head 6, and the chamber 30 is at all times communicated with the interior of the main cylinder by the passage 31. Hence the chambers 22 and 30, together with the interior of the main cylinder 2 and the communicating passages 12 and 31, may all be regarded as comprising a single main chamber.

The main chamber just described is filled with hydraulic fluid or similar incompressible liquid damping medium through a downwardly and inwardly inclined filler passage 33 opening through the end cap 3. An air bleed passage 32, which may form a lateral extension of the passage 31, opening to the exterior of the casing, provides for bleeding air out of the main chamber as it is filled with hydraulic fluid, and the filler passage 33 and air bleed passage 31 are closed by removable plugs 34. The main chamber is of course filled with hydraulic fluid with the main piston in its fully extended (no load) position, in which its head 6 seats on an upwardly facing shoulder 41 on the annular end member 4, and after both auxiliary chambers have been pressurized.

It will now be evident that each of the movable wall members or pistons 19 and 26 is exposed to hydraulic fluid at its top surface and to air under pressure at its bottom surface. When the main piston 5 is displaced upwardly into the main cylinder, as when a static vehicle load is imposed upon the shock absorber device, hydraulic fluid is forced downwardly through the passage 12 in the cylinder head, into the upper end of the auxiliary cylinder 8, specifically into the chamber 22, and the pressure thus imposed upon the hydraulic fluid by the retraction of the main piston displaces the movable wall element 19 downwardly in the auxiliary chamber 21, reducing the volume of said auxiliary chamber and further compressing the air therein. However, the movable wall member 26 of the second auxiliary chamber 29 will not be displaced downwardly until the main piston has been retracted to the point where the pressure of the air in the first auxiliary chamber 21, and on the hydraulic fluid, is greater than the preload pressure of the air in the second auxiliary chamber 29.

The graph, FIGURE 3, shows the travel S, of the main piston 5 in relation to compressive forces tending to move the cooperating shock receiving elements 1 and 5 toward one another, and illustrates the dual range of "springing" actions of the device of this invention. It should be borne in mind that the curve in FIGURE 3 does not take account of the effects of the damping means described hereinafter, and is therefore correct only for relatively gradual retracting actions of the piston.

When no compressive load is imposed upon the device, the head 6 of the main piston engages the upwardly facing shoulder 41 on the end piece with a downward force $P_0$ which derives from the pressure of the compressible medium in the first auxiliary chamber 21, exerted against the underside of the movable wall or piston member 19. As soon as an upward load is imposed upon the main piston which exceeds the value $P_0$ the main piston moves upwardly into the main cylinder, forcing hydraulic fluid downwardly through the bore 12 in the piston head and thereby displacing the movable wall member or piston 19 downwardly away from the piston head to reduce the volume of the first auxiliary chamber 21 and further compress the air therein. Such retracting movement of the piston and relative downward movement of the wall member 19 continues until an equilibrium is established between the opposing forces which are exerted on the wall member 19 by the hydraulic fluid and by the air or other compressible medium in the auxiliary chamber 21.

For loads below the value $P_1$ the movable wall member or piston 26 of the second auxiliary chamber will not be displaced downwardly, since the air pressure force exerted on its underside will exceed the force exerted on its upper surface by the liquid in the main chamber which includes the passage 31 and the subchamber 30. Thus within the loading range $P_0$—$P_1$, which includes the range of gross weights of the vehicle from empty to lightly loaded, the retraction of the main piston will be in amounts corresponding to the compression of the air in the first auxiliary chamber, as depicted by that portion of the curve to the left of the point $S_1$ in FIGURE 3.

When in further loading the vehicle the compression load on the main piston 5 exceeds the value $P_1$, corresponding to the air pressure preload in the second auxiliary chamber, the movable wall member or piston 26 is moved downwardly into its chamber, permitting corresponding further upward displacement of the main piston, the relationship of compression force across the lugs 39 and 40 to the displacement of the main piston then being in accordance with that portion of the curve which lies between the points $S_1$ and $S_{max}$. Under these conditions equilibrium obtains between the liquid and the air forces which act upon opposite sides of the movable wall member or piston 26.

As is apparent from FIGURE 3, at compression load values just above $P_1$, in which the second auxiliary chamber 29 becomes effective as a "spring" element, the "springing" action of the device is somewhat softer than for loads just below the value $P_1$, but when the load approaches the highest expectable value $P_{max}$, and the volume of the second auxiliary chamber approaches its minimum value, the main piston will be displaced through lesser distances for a given increase of load.

When the value $S_{max}$ is attained there still remains a space between the piston head 6 and the underside of the cap 3 at the top of the cylinder, to afford some degree of damping action through the main piston head 6. In order to prevent the main piston from hammering against the underside of the cap 3, under the force of unusually severe compression loads, a resilient bumper ring 43 is seated at the top of the cylinder 2 to be engaged by the top of the main piston head 6.

As the compression force across the shock receiving elements is unloaded, the auxiliary chambers increase their volume one by one, that is, the movable wall member or piston 19 tends to remain in its lowermost position until the movable wall member or piston 26 has returned to its upper position.

It should be understood that the curve of FIGURE 3 does not precisely portray the response of the main piston to shock loads, such as those occurring as a result of irregularities in a road surface. This is because the retracting and extending motions of the main piston are damped by causing the hydraulic fluid in the main chamber to flow through certain throttling restrictions thus creating fluid friction by which energy is absorbed. This damping action is provided for by the restricted coaxial bore 12 through the piston head 6, in conjunction with a sort of check valve provided by an axially movable annular valve element 17 in an annular chamber 16 in the piston head, which controls flow of fluid through passages 15 opening from the upper surface of the piston head to said chamber, and passages 18 extending radially from said chamber to the periphery of the piston head.

For example, as the main piston moves upwardly, hydraulic fluid flows through the passage 12 in the piston head into the chamber beneath it. Fluid entering the axial passages 15 unseats the check valve 17 to enable fluid to flow downwardly into the chamber 16 in the piston head, and thence, through the radial passages 18, into the annular space 42 between the wall of the main cylinder and the piston rod 8. It will be seen that the flow of hydraulic fluid through these relatively restricted passages affords some damping action, but a greater degree of damping is effected when the main piston begins its return stroke, by reason of the fact that the annular valve member 17 is then forced upwardly to a position covering the axial passages 15 by the fluid exhausting from the annular space 42 into the chamber 16. The flow through the passages 15 is then restricted to such fluid as bleeds through small bleed apertures in the annular valve member. Thus the rate of return of the main piston is governed by the rate at which hydraulic fluid can flow out of the annular space 42 through the bleed passages in the check valve member, as may be seen from FIGURE 2.

During retraction of the piston its rate of motion is in part controlled by the bore 12, up to the point $P_1/S_1$ on the curve, FIGURE 3, at which point fluid no longer flows through the bore 12 because the movable wall member or piston 19 has reached its lower limit of motion away from the piston head; and thereafter fluid flows through the passage 31 which, because of its limited cross sectional area, also absorbs some energy and effects some damping of retracting motion of the main piston. Of course the damping action afforded by the valve controlled passages 15 and 18 is effective throughout the full retracting stroke of the main piston.

The "springing" characteristics of the device are obviously dependent upon several factors, such as the choice of the compressible medium, the dimensions of the auxiliary chambers 21 and 29, and the initial preload pressures in said chambers, which latter factor determines the position of the points $S_1/P_1$ in FIGURE 3, or in other words, the dividing point between the two working ranges of the device.

The discontinuity in the "springing" curve which exists at the point $S_1/P_1$ is normally not detrimental to the road characteristics of a vehicle equipped with air-oil shock absorbers of this invention. Under some circumstances it may be desirable to provide a device of this invention with more than two auxiliary chambers, each preloaded to a different initial pressure, so that each in turn acts as a "springing" element, and the limits of the different parts of the working range of the device provided by each such chamber will then be less noticeable.

Obviously the movable wall members 19 and 26 could be formed as diaphragms, and the short cylinder 25 could be disposed in coaxial end-to-end relation with the main cylinder 2 instead of alongside of it.

From the foregoing description, taken together with the accompanying drawings, it will be apparent that this invention provides an air-oil shock absorber which is especially suited for installation on surface vehicles that may be loaded to widely varying gross weights, and wherein the main piston of the shock absorber is biased downwardly in such a manner as to provide a dual range of "springing" actions, in part of which the weight of the vehicle itself, plus its load, is substantially accommodated, and in the remainder of which normal "springing" action takes place. It will also be apparent that no steel springs are required with the air-oil shock absorbers of this invention, all "springing" occurring as the result of compression of an elastically compressible fluid medium, and that the device of this invention also provides an effective damping action which prevents excessively rapid retraction and extension of the main piston.

What is claimed as our invention is:

1. A shock absorbing device which is connected between a pair of shock receiving elements, for cushioning abrupt shocks tending suddenly to move one of said elements toward and from the other, said device comprising: a cylinder fixed to one of said elements and providing a main chamber adapted to contain substantially incompressible liquid; a hollow piston axially telescopingly slidable in the cylinder and connected with the other of said elements for movement therewith; means defining a movable wall in the hollow interior of the piston opposing and cooperable with the outer end portion thereof to define a variable volume pressure chamber in the piston in which compressible medium is maintained under a pressure which has a predetermined minimum value when the pressure chamber is at maximum volume; means defining a restricted passage communicating the main chamber with the pressure chamber at the side of the movable wall adjacent to the inner end of the piston, to cause the movable wall to move in response to changes in pressure of the liquid, due to movement of the piston relative to the cylinder, and to transmit such pressure changes to the compressible medium in the pressure chamber, the restriction of such passage means providing for retardation of piston movement relative to the cylinder; a second variable volume pressure chamber, comprising means fixed with respect to the cylinder and a second wall movable in opposite directions to increase and decrease the volume of the second pressure chamber; at one side of said second movable wall; means providing another restricted passage communicating the main chamber with said second pressure chamber at the other side of said second movable wall whereby the latter is caused to be moved in response to changes in pressure of the liquid; and means defining a predetermined limit of motion of said second movable wall in the direction to increase the volume of said second pressure chamber, to enable said second chamber to be filled with compressible medium at a substantially higher predetermined pressure than the first chamber, so that said second movable wall has no tendency to move in response to increasing liquid pressure until the volume of the first chamber has been reduced to a substantial extent by compression of the compressible medium therein.

2. The shock absorbing device of claim 1, further characterized by unidirectional valve means in said first designated restricted passage means, cooperable with liquid in the main chamber to provide a greater degree of retardation of movement of the piston relative to the cylinder in one direction than the other.

3. In a shock absorbing device including a pair of shock receiving elements that are movable toward and from one another: a main cylinder fixed to one of said shock receiving elements and filled with a substantially incompressible liquid; a main piston in said main cylinder fixed to the other of said shock receiving elements to move therewith; a pair of auxiliary cylinders carried by the device, each having a closed end, a port remote from the closed end, and an auxiliary piston; means providing restricted communication between the main cylinder and the ports of said auxiliary cylinders, so that movement of the main piston in one direction in the main cylinder increases the pressure on liquid therein and thereby tends to effect motion of the auxiliary pistons in the auxiliary cylinders toward the closed ends of the latter, and whereby movement of the main piston in both directions is dampingly retarded; and compressed air at different pressure values in said auxiliary cylinders, to yieldingly resist such movement of the auxiliary pistons therein.

4. In a shock absorbing device including a pair of shock receiving elements that are movable relatively toward and from one another: a main cylinder connected to one of said shock receiving elements and filled with a substantially incompressible liquid; a main piston in said main cylinder having a hollow piston rod which is connected to the other shock receiving element; a first auxiliary piston slidable in the piston rod and cooperable with the end portion thereof remote from the main piston to define a first variable volume chamber adapted to contain air under pressure; means defining a restricted passage axially through the main piston communicating the main cylinder with the end portion of the piston rod adjacent to the main piston so that movement of the main piston axially into the main cylinder, by which pressure on the liquid in said cylinder is increased, tends to effect motion of the first auxiliary piston away from the main piston, increasing the pressure of air in the first auxiliary chamber, and so that the motion of the main piston is retarded by the restriction to liquid flow afforded by said passage defining means; means defining an auxiliary cylinder fixed relative to the main cylinder; a second auxiliary piston in said auxiliary cylinder cooperable with one end portion thereof to define a second variable volume chamber adapted to contain air under higher pressure; and means providing a second restricted passage communicating the main cylinder with the other end portion of the auxiliary cylinder so that movement of the main piston axially into the main cylinder beyond a certain point effects motion of the second auxiliary piston toward said one end of the auxiliary cylinder, increasing the pressure of air in the second variable volume chamber.

5. The shock absorbing device of claim 4, further characterized by the fact that said auxiliary cylinder is disposed adjacent and parallel to the main cylinder; further characterized by the fact that said second restricted passage means communicates said cylinders at their adjacent ends; and further characterized by means providing an bleed passage communicated with said second restricted passage means and which is adapted to be closed by a plug, said air bleed passage allowing air to flow out of the main cylinder, said other end portion of the auxiliary cylinder, and said second restricted passage means when the main cylinder is filled with liquid.

6. The shock absorbing device of claim 4, further characterized by the fact that said piston rod cooperates with the main piston and the main cylinder to define an annular variable volume liquid chamber; further characterized by means defining another restricted passage through the main piston communicating the main cylinder with said annular chamber and which provides further damping retardation of movement of the main piston relative to the main cylinder.

7. The shock absorbing device of claim 6, further characterized by the fact that said means defining another passage through the main piston includes unidirectional valve means providing greater retardation of liquid flow in one direction through said passage than in the other.

8. In a shock absorbing device including a pair of relatively movable shock receiving elements, means for cushioning abrupt, irregular relative movements of said elements, comprising: chamber defining means including wall means fixed with respect to one of said elements and a wall member fixed with respect to the other element; a substantially incompressible liquid filling said chamber so that relative movement of said shock receiving elements in one direction subjects the liquid to an increase in pressure; a pair of auxiliary chambers, each including a movable wall member; means providing a pair of restricted passages, each connecting one of said auxiliary chambers at one side of the movable wall member thereof in liquid transfer relation with the main chamber whereby increases in pressure upon the liquid in the main chamber produced in consequence of relative movement of said shock receiving elements in said direction is translated into a force upon the movable wall member of the auxiliary chambers tending to move said wall members in one direction in their associated chambers, and whereby relative movement of the shock receiving elements is damped due to the restriction to flow of liquid provided by said passage means; and a compressible pressurized medium in each of said auxiliary chambers, at the other side of the movable wall member thereof, to yieldingly resist movement of the movable wall member in said direction, the compressible medium in one auxiliary chamber being normally at a higher predetermined pressure than that in the other auxiliary chamber so as to provide greater resistance to movement of the movable wall of said one auxiliary chamber in said one direction.

9. A shock absorbing device which is connected between a pair of shock receiving elements, for cushioning abrupt, irregular movements of one of said elements toward and from the other, and of the type comprising a cylinder containing liquid, a piston telescopingly slidable in the cylinder, and variable volume chamber means in which compressible medium is adapted to be confined under pressure, including movable wall means exposed at one side to compressible medium and at the other side to said liquid, said device being characterized by the fact that: said variable volume compression chamber means comprises a plurality of compression chambers, in each of which compressible medium is confined at a different pressure when the compression chambers are at maximum volume so that each chamber functions as a resilient cushioning element within its own predetermined loading range; by means cooperating with said movable wall means to define a damping chamber for each of said compression chambers in which said liquid is in contact with the other side of the movable wall means; and further by throttling orifice means for each damping chamber providing the only communication between the damping chamber and the cylinder and allowing only restricted flow of said liquid between the cylinder and the damping chamber whereby the sliding velocity of the piston in the cylinder is damped, said throttling orifice means having check valve means associated therewith for causing greater restriction to liquid flow in one direction than in the other between the cylinder and one of the damping chambers.

10. A shock absorbing device connected between a pair of shock receiving elements, for cushioning abrupt, irregular movements of one of said elements toward and from the other, and of the type comprising a cylinder containing liquid, a piston telescopingly slidable in the cylinder, and variable volume chamber means in which compressible medium is adapted to be confined under pressure, including movable wall means exposed at one side to compressible medium and at the other side to said liquid, said device being characterized by the fact that: said variable volume chamber means comprises a plurality of compression chambers, each having a movable wall means associated therewith; by means cooperating with said movable wall means to define a damping chamber for each of said compression chambers in which said liquid is in contact with the other side of the movable wall means; by throttling orifice means for each damping chamber providing only restricted communication between the cylinder and the damping chamber whereby the flow of liquid between the cylinder and the damping chamber is retarded to limit the sliding velocity of the piston in the cylinder, the throttling orifice means for one of the damping chambers having means to render it more restrictive to the flow of liquid in one direction than the other; and further characterized by means cooperable with the movable wall means associated with each compression chamber to define the maximum volume position of the wall means so that the compression chambers can contain compressible medium at pressures which, when the compression chambers are at maximum volume, differ substantially from one another to cause each chamber to function as a resilient cushioning element within its own predetermined loading range.

References Cited in the file of this patent

UNITED STATES PATENTS

| | | |
|---|---|---|
| 2,146,089 | Onions | Feb. 7, 1939 |
| 2,451,171 | Mullen | Oct. 12, 1948 |
| 2,769,632 | Bourcier De Carbon | Nov. 6, 1956 |
| 2,959,410 | Fullam | Nov. 8, 1960 |